United States Patent
Glinec (10) Patent No.: US 10,043,287 B2
(45) Date of Patent: Aug. 7, 2018

(54) AUTOMATIC RESTITCHING OF 3D SURFACES

(71) Applicant: Carestream Dental Technology Topco Limited, London (GB)

(72) Inventor: Yannick Glinec, Montevrain (FR)

(73) Assignee: Carestream Dental Technology Topco Limited, London (GB)

( * ) Notice: Subject to any disclaimer, the term of this patent is extended or adjusted under 35 U.S.C. 154(b) by 0 days.

(21) Appl. No.: 15/329,614

(22) PCT Filed: Aug. 27, 2014

(86) PCT No.: PCT/CN2014/085304
§ 371 (c)(1),
(2) Date: Jan. 27, 2017

(87) PCT Pub. No.: WO2016/029383
PCT Pub. Date: Mar. 3, 2016

(65) Prior Publication Data
US 2017/0213354 A1   Jul. 27, 2017

(51) Int. Cl.
| | | |
|---|---|---|
| *G06K 9/00* | (2006.01) | |
| *G06T 7/55* | (2017.01) | |
| *G06T 7/521* | (2017.01) | |
| *G06T 15/10* | (2011.01) | |
| *G06F 19/00* | (2018.01) | |

(52) U.S. Cl.
CPC ............... *G06T 7/55* (2017.01); *G06T 7/521* (2017.01); *G06T 15/10* (2013.01); *G06T 2207/10028* (2013.01); *G06T 2207/30036* (2013.01)

(58) Field of Classification Search
CPC .................................... G06T 7/00; G06K 9/00
USPC ....... 382/128, 129, 130, 131, 132, 133, 134, 382/154, 294; 700/98
See application file for complete search history.

(56) References Cited

U.S. PATENT DOCUMENTS 8,303,505 B2 * 11/2012 Webler ................ G06F 19/3437
600/437
2003/0012423 A1   1/2003 Boland et al.

FOREIGN PATENT DOCUMENTS

| CN | 101542537 | 9/2009 |
| CN | 103606183 | 2/2014 |
| WO | 2012/088477 | 6/2012 |

OTHER PUBLICATIONS

International Search Report, dated May 26, 2015 International Application No. PCT/CN/2014/085304, 4 pages.

* cited by examiner

*Primary Examiner* — Abolfazl Tabatabai (57) ABSTRACT

A method for displaying a 3-D surface of an object, the method executed at least in part on a computer, acquires a set comprising a plurality of members, wherein each member is a 3-D view of the object Relation data that associates each member of the set of 3-D views to at least one other member of the set is generated according to at least displacement between the members. A composite 3-D surface of the object is formed according to the generated relation data. One or more positioning errors in the composite surface are automatically detected according to the generated relation data and at least a portion of the relation data re-generated to correct the one or more positioning errors. A corrected composite 3-D surface formed according to the re-generated relation data is displayed.

15 Claims, 8 Drawing Sheets

AUTOMATIC RESTITCHING OF 3D SURFACES

CROSS REFERENCE TO RELATED APPLICATIONS

This application claims the benefit of and is a US national phase filing of PCT application No. PCT/CN2014/085304 filed Aug. 27, 2014 that is entitled, "AUTOMATIC RESTITCHING OF 3D SURFACES", in the name of Yannick Glinec; the disclosure of this priority application is incorporated herein by reference in its entirety.

FIELD OF THE INVENTION

The invention relates generally to 3-dimensional (3-D) imaging and more particularly relates to displaying a composite 3-D surface that is formed from a sequence of 3-D scans and automatically detecting and correcting errors in the process of forming the composite 3-D surface.

BACKGROUND OF THE INVENTION

3-D surface scans are widely used in a number of fields, including medical and dental applications. Detailed 3-D surface scans of a patients mouth have particular value as a planning resource and for tracking patient progress in orthodontics, restoration, prosthesis, and related dental procedures.

For dental imaging and other types of 3-D imaging, it is often the case that multiple views of an object are acquired in order to represent 3-D surface content for the object. Separate views of the object are captured from different perspectives along the object and are then stitched together by imaging software in order to represent 3-D data in the form of a composite 3-D surface. The process of matching or associating the individual 3-D views is sometimes referred to as stitching. As part of view stitching, each individual 3-D view is matched with views of adjacent portions of the subject and has associated translation and rotation characteristics assigned for assembly of the composite 3-D surface.

For dental imaging, a succession of 3-D views is captured by scanning the patient's mouth using an intra-oral camera. 3-D view content is generated, for example, using patterned light methods, such as fringe projection, or by obtaining point cloud data corresponding to each tooth and soft tissue surface, such as using "structure-from-motion" (SFM) imaging technique, a range imaging method that is familiar to those skilled in the image processing arts. Multi-view imaging and some applicable structure-from-motion techniques are described, for example, in U.S. Patent Application Publication No. 2012/0242794 entitled "Producing 3D images from captured 2D video" by Park et al., incorporated herein in its entirety by reference. Alternate methods for acquiring surface image content could also be used, such as methods using depth information from focus data, radio-frequency (RF) triangulation, timed detection sequencing, stereo-vision and other methods.

In processing for view stitching, the imaging system operates on this acquired surface data for each successive scanned view and calculates the needed alignment information (including rotation and translation) that is used for stitching together each of the acquired 3-D views. For various image stitching approaches, reference is made to U.S. Pat. No. 8,600,193 to Kalayeh; to U.S. Pat. Nos. 7,362,890 and 7,551,760 to Scharlack et al.; to U.S. Patent Application Publication No. 2014/0152660 by Lee et al.; to U.S. Patent Application Publication No. 2012/0320052 by Givon.

One recurring problem with existing 3-D view stitching methods relates to error detection for placement of the acquired 3-D views relative to neighboring images. In order to detect and respond to an error in component image placement, the imaging system often requires operator input or even deletion of a poorly matched view segment. Operator-assisted error detection and correction methods are highly undesirable and error prone. More robust and efficient algorithms for automatic detection and correction of image matching errors are needed in order to make 3-D imaging apparatus more powerful and useful for dental imaging and other applications.

Misplacement of a 3-D view in image processing may occur for any of a number of reasons, including timing constraints and incomplete information. The initial stitching decision by the automated assembly process must be provided quickly in order to provide visual feedback with a minimum of delay, for a suitable viewer experience. In addition, only partial information may be available to the stitching algorithm as the data is being collected. Erroneous placement is sometimes apparent only after additional placement relationships have been computed and results displayed. There is thus a need for automated methods for detecting misplacement and related errors in matching adjacent 3-D views and for correcting these errors without requiring operator intervention.

SUMMARY OF THE INVENTION

An object of the present disclosure is to advance the art of surface imaging, for applications that form and represent a composite 3-D surface by combining a succession of scanned 3-D views. An object of the present disclosure is to provide apparatus and methods for automatically detecting and correcting errors in combining the scanned image content.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for displaying a 3-D surface of an object, the method executed at least in part on a computer and comprising:
  acquiring a set comprising a plurality of members, wherein each member is a 3-D view of the object;
  generating relation data that associates each member of the set of 3-D views to at least one other member of the set according to at least displacement between the members;
  forming a composite 3-D surface of the object according to the generated relation data;
  automatically detecting one or more positioning errors in the composite surface according to the generated relation data and re-generating at least a portion of the relation data to correct the one or more positioning errors; and
  displaying a corrected composite 3-D surface formed according to the regenerated relation data.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF EXEMPLARY EMBODIMENTS

The following is a detailed description of exemplary methods and/or apparatus embodiments of the invention, reference being made to the drawings in which the same reference numerals identify the same elements of structure in each of the several figures.

In the drawings and text that follow, like elements are designated with like reference numerals, and similar descriptions concerning elements and arrangement or interaction of elements already described are omitted. Where they are used, the terms "first", "second", and so on, do not necessarily denote any ordinal or priority relation, but are simply used to more clearly distinguish one element from another.

In the context of the present disclosure, the terms "viewer", "operator", and "user" are considered to be equivalent and refer to the viewing practitioner or technician or other person who views and manipulates an image, such as a dental image, on a display monitor. An "operator instruction" or "viewer instruction" is obtained from explicit commands entered by the viewer, such as using a computer mouse or touch screen or keyboard entry.

In the context of the present disclosure, the term "3-D view" is synonymous with the terms "3-dimensional image" or "3-D scan". 3-D views show surface data of a tooth or other structure, obtained from one or more reflectance images of the surface. The term "reflectance image" refers to an image or to the corresponding image data that is captured by a camera using reflectance of light; the reflected illumination is, typically, but not necessarily, visible light. Reflectance images are converted into 3-D views in any of a number of ways, depending on how the surface data is to be represented, as described in more detail subsequently. 3-D views can be obtained using any of a number of different technologies, including laser scanning devices, stereo imaging devices, color depth cameras, and other imaging devices that acquire depth information, or point cloud data related to the acquired image content, including range imaging and mesh imaging devices. Devices that use structured light or patterned illumination, such as fringe projection imagers, can also be employed to obtain 3-D views.

In the context of the present disclosure, a "composite surface" or "composite 3-D surface" is a 3-D surface that is formed by matching a plurality of 3-D views (e.g., a succession of multiple scanned 3-D views). Such 3-D views can also be considered "component" views that are combined to form the composite surface. Scanned 3-D views can have surface data in any of a number of forms, including patterned light or "fringe projection", point cloud, or other surface image data.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

As used herein, the term "energizable" relates to a device or set of components that perform an indicated function upon receiving power and, optionally, upon receiving an enabling signal.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual organ, bone, or structure, or a path or cavity extending from one feature to the next, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

In the context of 3-D view matching according to the present disclosure, the term "displacement" preferably relates to translation and rotation of one 3-D view of an object relative to another.

Embodiments of the present disclosure can use a multi-view imaging technique that obtains 3-D structural information from 2-D images of a subject, taken at different positions (e.g., angles) about the subject. Processing for multi-view imaging can employ "structure-from-motion" (SFM) imaging technique, a range imaging method that is familiar to those skilled in the image processing arts. Multi-view imaging and some applicable structure-from-motion techniques are described, for example, in U.S. Patent Application Publication No. 2012/0242794 entitled "Producing 3D images from captured 2D video" by Park et al., incorporated herein in its entirety by reference.

Figure 1:
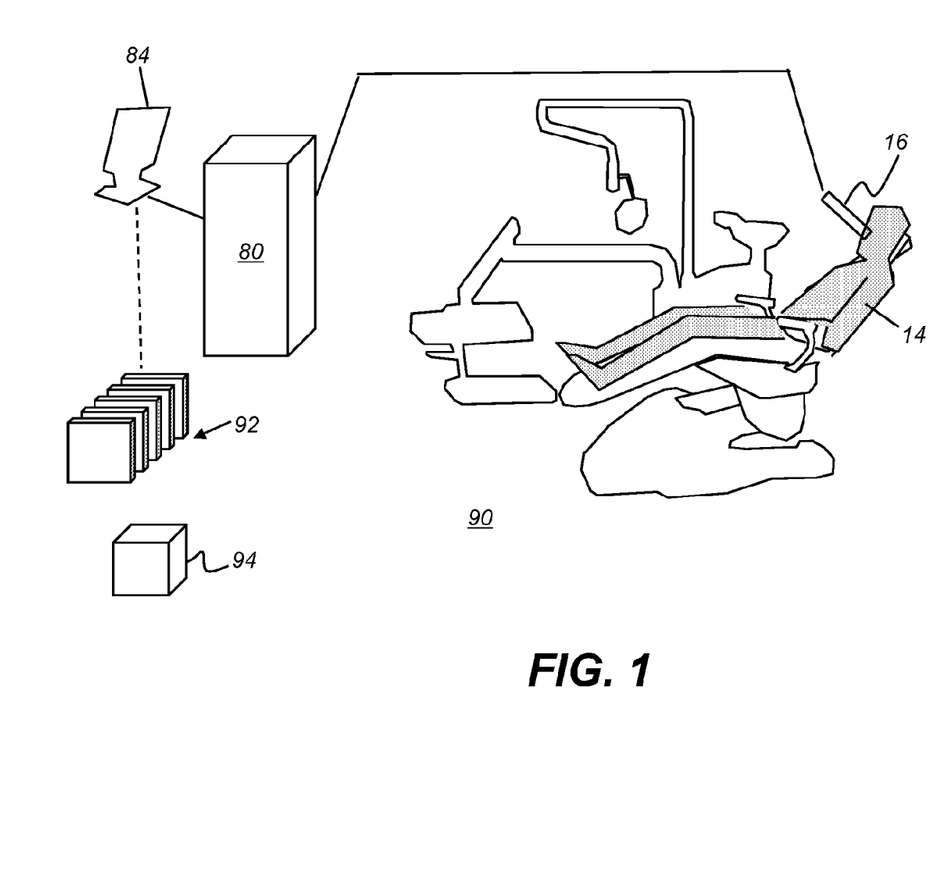
FIG. 1 is a logic flow diagram that shows an imaging apparatus for obtaining a 3-D view from a succession of 2D images according to an embodiment of the application.

The schematic diagram of FIG. 1 shows an imaging apparatus 90 for obtaining a 3-D view from a succession of reflectance images according to an embodiment of the present disclosure. A camera 16, typically a hand-held digital camera, a color depth camera, handheld 3-D scanner, or intra-oral 3-D scanner, is scanned through the mouth of a patient 14 for acquiring a set having multiple reflectance images and associated depth information. A control logic processor 80, in signal communication with camera 16, obtains image data from camera 16 and processes this image data along with depth information in order to generate individual 3-D views 92. Control logic processor 80 then combines the scanned 3-D views in order to generate and display, on a display 84, a composite 3-D surface 94. Error detection and correction logic on control logic processor 80 can then operate to identify mis-matched or poorly matched 3-D views 92 and generate and display a corrected composite 3-D surface 94 using methods and/or apparatus embodiments of the application. In some embodiments, hardware and/or logic processing to be and/or perform the error detection and correction logic can be provided in the camera 16, the control logic processor 80, the display 84 or in remote computers/hardware to assemble and adjust the composite view (e.g., independent of operator intervention or input).

Figure 2A:
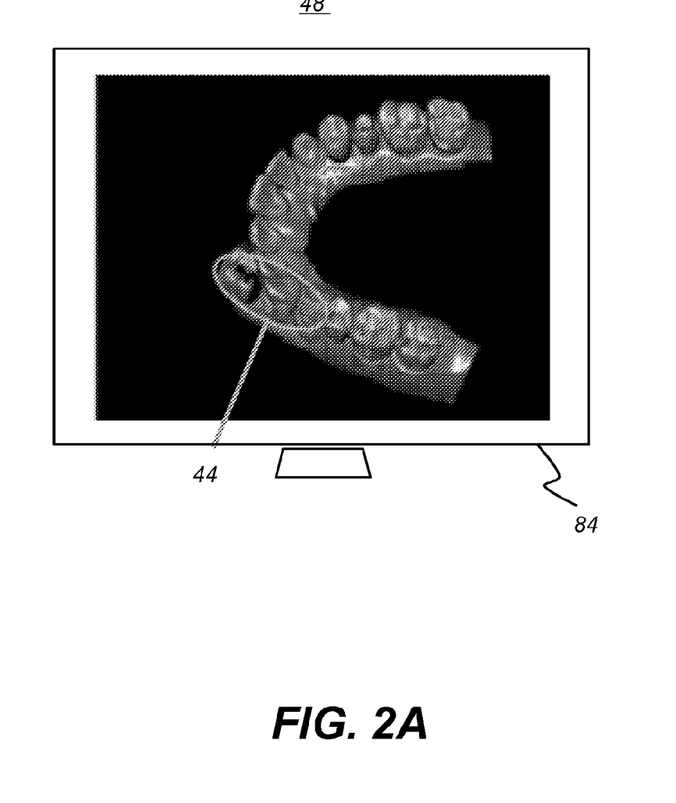
FIG. 2A shows a composite 3-D surface that has a poorly connected segment according to embodiments of the application.
Figure 2B:
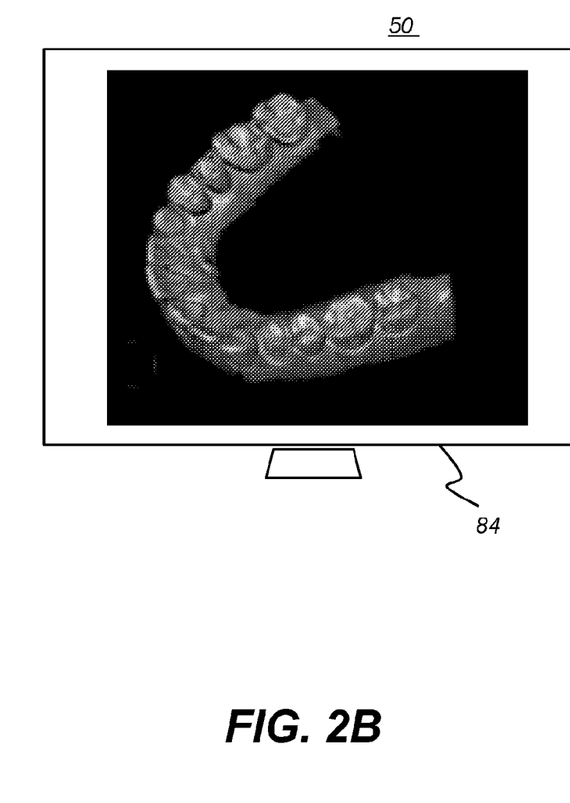
FIG. 2B shows a corrected view of the composite 3-D surface of FIG. 2A.

By way of example, FIG. 2A shows a displayed composite 3-D surface 48 that has a poorly connected segment linked by an articulation 3-D view 44, shown circled. Embodiments of the present disclosure detect and correct for this type of connection error and/or other connection errors to provide the corrected composite 3-D surface 50 of FIG. 2B.

Figure 3:
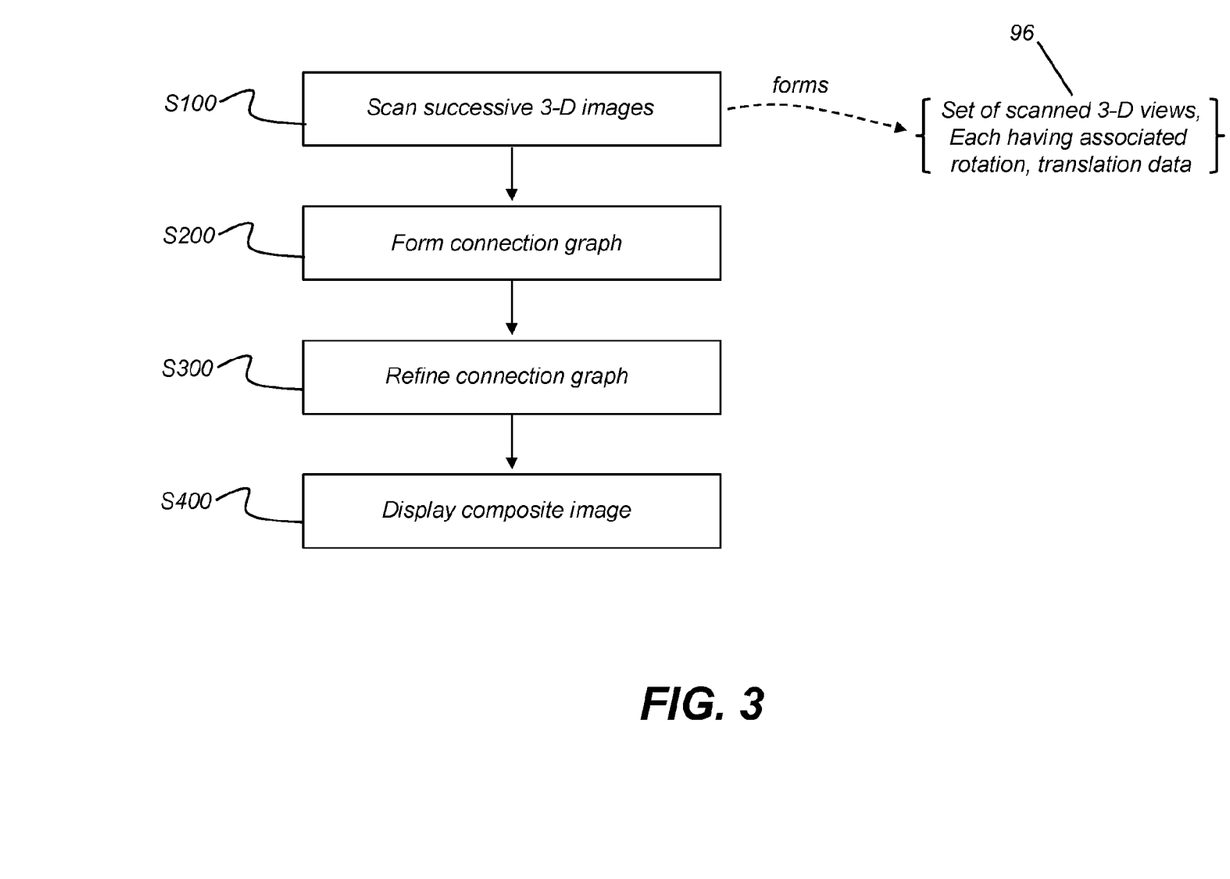
FIG. 3 is a logic flow diagram that shows a process for 3-D view stitching and correction according to another embodiment of the present disclosure.

The logic flow diagram of FIG. 3 shows a processing sequence for generating and displaying a composite 3-D surface according to an embodiment of the present disclosure. In a scanning step S100, the technician or practitioner scans the patient's teeth and acquires a set of images that are obtained and processed to generate a set of 3-D views 96 that can be combined, for example, to form the composite 3-D surface 94. The type of processing needed for generating 3-D view data from scanned images depends on the imaging type that is used. For point cloud data, for example, range imaging methods, familiar to those skilled in the surface imaging arts, may be used. In a graph forming step S200, the processor generates the 3-D view data for the different obtained images according to a connection graph model that can then be analyzed for poorly connected component 3-D views 92 from set of views 96. A refinement step S300 then refines the connection graph in order to provide improved matching of the connected component 3-D surface views 92. A display step S400 displays processing results resulting from refinement of the connection data for scanned 3-D views.

View stitching processes for generating a composite 3-D surface from an acquired set of scanned 3-D views are known to those skilled in the image processing arts. However, existing systems that provide image stitching do not provide utilities that automatically detect and correct problems due to poor matching and contradictory or conflicting matching transforms. In contrast to existing techniques, embodiments of the present disclosure employ an innovative approach that enables automated detection and correction of image matching anomalies for generating the composite 3-D surface. Embodiments of the present disclosure do not require operator intervention, such as operator instructions to "manually" delete views or delete or recalculate transforms that appear to be the source of a problem.

Exemplary embodiments of the present invention can employ a graph model and associated logic in order to provide suitable matching between the acquired and processed 3-D views 92 (FIG. 1). The inventor has found that features of graphing logic can be effectively used to help identify and correct image matching anomalies such as that shown in FIG. 2A, in which the initial matching logic performed poorly and corrective action must be taken in order to provide an accurately assembled composite 3-D surface. It must be emphasized that the connection graph model that is used provides a convenient exemplary mechanism for ordering and arranging data about different 3-D views 92 and allows a straightforward algorithmic analysis of the positional relationships between views. The connection graph itself need not be displayed; this model merely helps to describe and visualize how image processing can assess and rearrange positional parameters (e.g., rotation, translation) for each 3-D view in order to assemble and adjust the composite view, independent of operator intervention or input.

Figure 4:
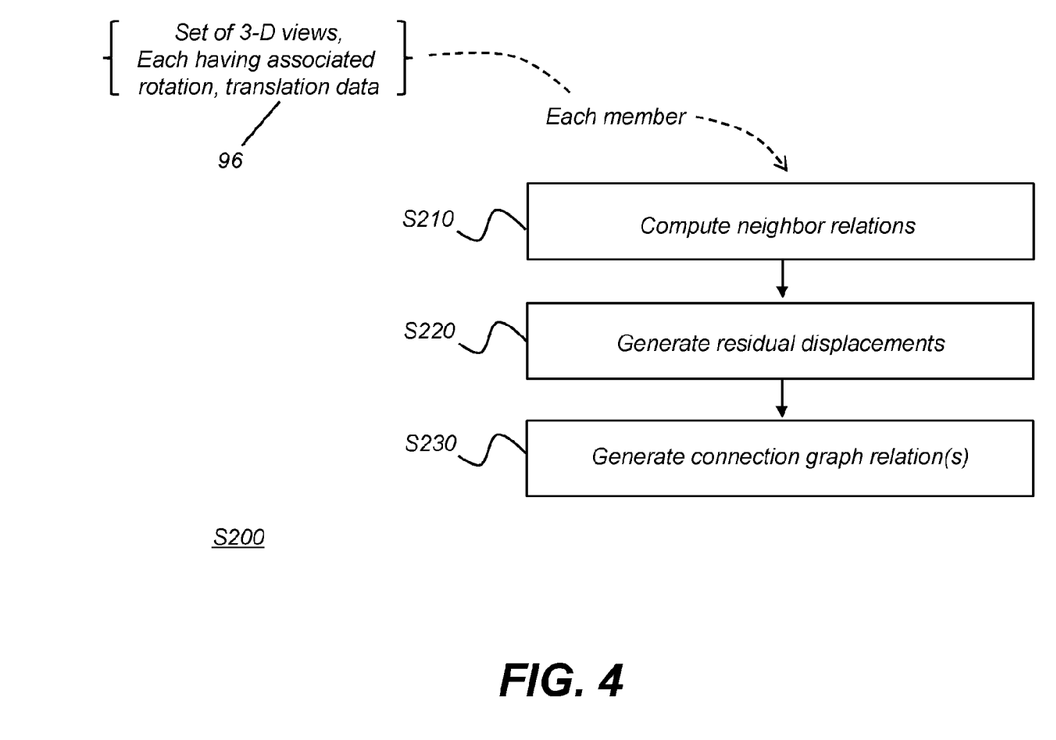
FIG. 4 is a logic flow diagram that shows a sequence for forming a connection graph according to a sequence of scanned images according to embodiments of the application.

The logic flow diagram of FIG. 4 shows some exemplary sub steps for graph forming step S200. Steps can repeat for each member of scanned 3-D view set 96. In a neighbor relations computation step S210, each scanned 3-D view 92 is analyzed and matched to its neighboring views. In the context of the present disclosure, a neighboring view for a given scanned 3-D surface view 92 is considered to be a view whose center lies within a predetermined radius of the given view 92. However, other exemplary measures can be used to define a neighboring view. The predetermined radius can be empirically determined, based on 3-D view size, which is related to scanner Field-Of-View and can vary between imaging systems. View matching for relating views 92 within the neighborhood can use a number of utilities and approaches familiar to those skilled in the image processing arts. In general, matching uses any available information that associates a newly scanned view 92 with any other view. This can include, for example, information obtained from camera 16 (FIG. 1) on relative camera motion, camera position, video tracking, or pose information related to the object. This can also include information on surface features for other surface views 92. The outcome of step S210, for each 3-D view 92, can be a set of neighbor relations that are used in subsequent processing to position or reposition that view within a connection graph. Neighbor relations can be expressed as transforms that rotate and translate a scanned 3-D view relative to the identified neighbor. These transforms can readily take the form of conventional matrices for view translation and rotation, such as the 4×4 matrices that are familiar to those skilled in the 3-D view processing arts. A residual displacement step S220 computes any residual displacement between the current position of a view and its expected position, based on neighbor relations.

Connected views are obtained from the set of neighbor relations. Connection criteria can include obtaining relative values for translation and rotation between existing 3-D view position and neighbor relations. Various decision methods can be employed for determining view connectivity, such as using residual displacement with respect to desired or optimal positions. For instance, a view V1 may be connected to a view V2 in its neighborhood by performing the following:
 (i) compute the expected position of V1 from its neighbor relation with V2;
 (ii) compute the residual displacement between current position of V1 and expected position;
 (iii) compute translation amplitude and rotation amplitude from the residual displacement;
 (iv) consider V1 and V2 connected if translation amplitude is below a first threshold and rotation amplitude is below a second threshold.

The computation of connectivity information for all pairs of neighbor views provides a set of connections, called the connection graph. The connection graph that is used for composite surface display is generated in a connection graph generation step S230.

Figure 5:
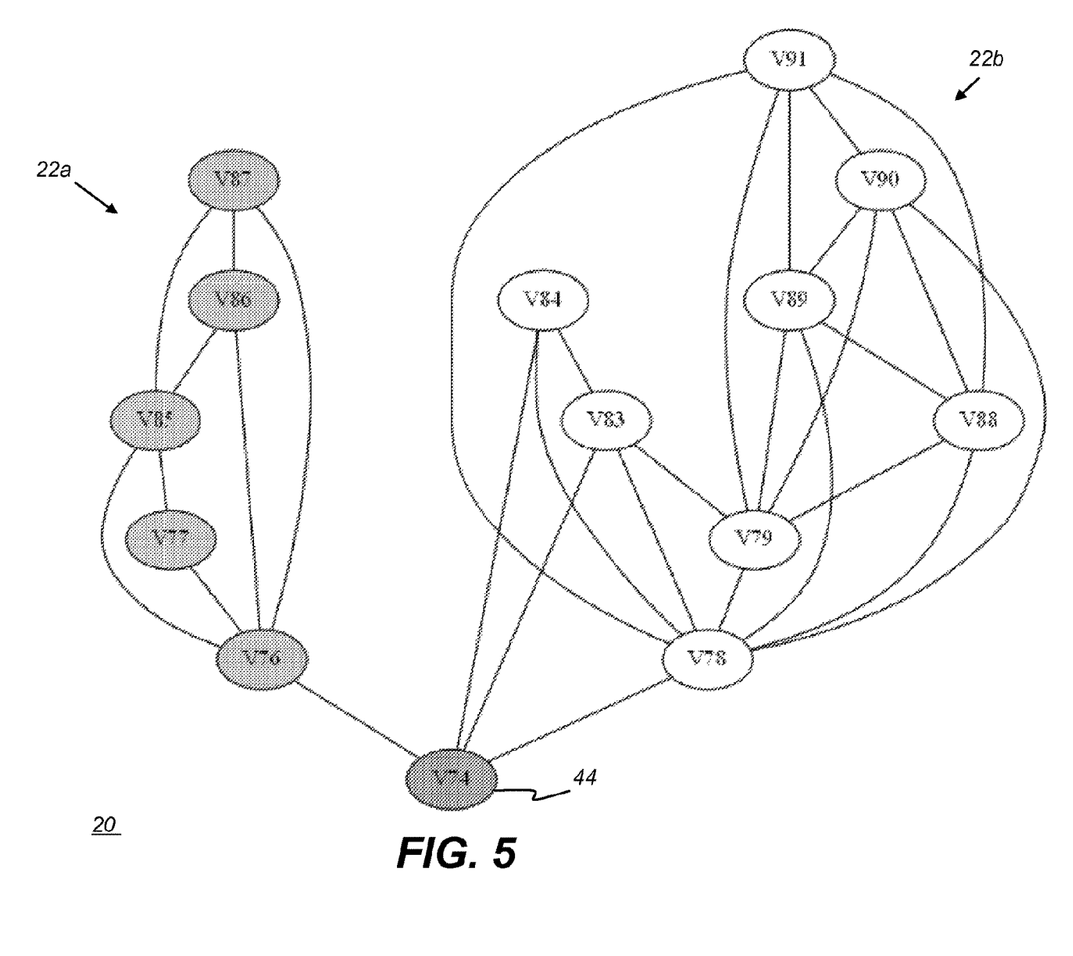
FIG. 5 shows an example connection graph.

FIG. 5 shows an exemplary connection graph 20 for a small set of scanned 3-D views. Each vertex or node in the connection graph 20 represents a scanned 3-D view. Each edge (line) represents a connected view relation between 3-D views, based on proximity and on view matching criteria previously described.

As the arrangement of graph 20 in FIG. 5 shows, view V74 is termed an articulation 3-D view 44, that would generate two clusters of views, group 22a and 22b, if removed. Group 22a to the left in graph 20 has component 3-D views V76, V77, V85, V86, and V87. Group 22b to the right in graph 20 has component 3-D views V78, V79, V83, V84, V88, V89, V90, and V91. In this particular case, view V74 has a unique connection to group 22a, which can be removed to generate two distinct clusters, which can be followed by repositioning of views from group 22a onto group 22b.

The mapping of connection graph 20 can provide significant useful information about how the composite 3-D surface is organized and where relations that are relatively poor or unlikely can operate to cause view stitching anomalies such as that shown in FIG. 2A. As a general rule-of-thumb that underlies matching and rematch processing, poor matches are generally inconsistent with each other. These types of relationships can be readily represented when the network of relationships is expressed as a connection graph. Other problems related to poor matching are readily visible using connection graph representation. In FIG. 5, for example, articulation view V74 has only a single relation to view V76 and thus to the balance of group 22a. This type of arrangement is characteristic of the poorly connected segment, such as that shown in FIG. 2A and may indicate that further computation would be helpful for more robust arrangement of views.

Refinement Processing

Figure 6:
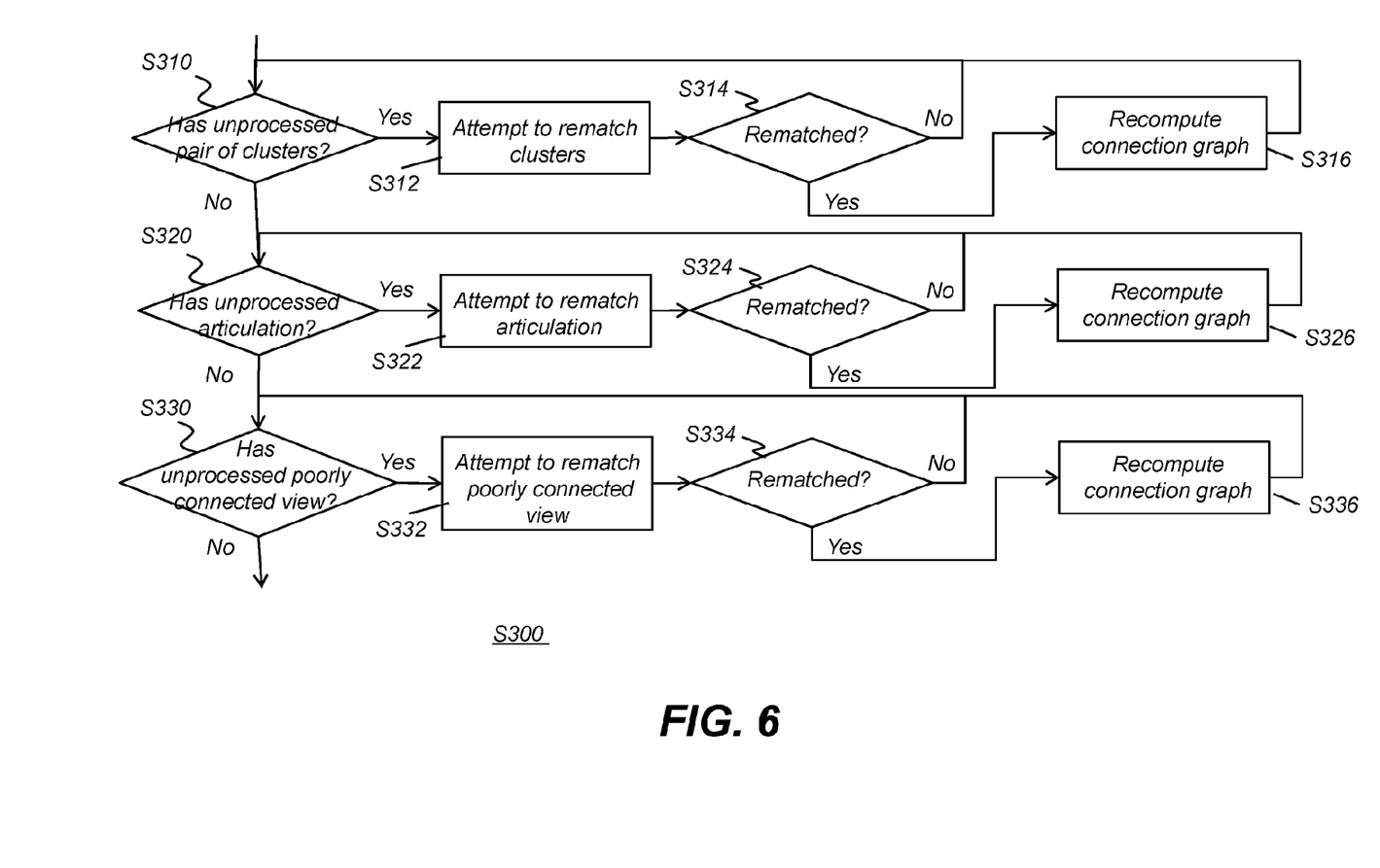
FIG. 6 is a logic flow diagram showing processes for refining the connection graph, including detection and correction of errors according to yet another embodiment of the application.

Given an initial connection graph 20 such as that shown in the example of FIG. 5, the logic flow diagram of FIG. 6 shows exemplary processes for refining the connection graph in refinement step S300 (FIG. 3), including detection and correction of errors and rematching of views that appear to have weak connections and that may be poorly connected due to articulations and/or other factors according to embodiments of the application. In the procedural flow that is shown, a decision step S310 determines if there are one or more unprocessed pairs of clusters that suggest a poor match. If not, processing continues to the next decision step S320. If there are unprocessed clusters, a correction step S312 executes, in which processor computation attempts to rematch the cluster. This can involve removing one or more relations (e.g., transformations) and recalculating to determine if other relations improve the connection pattern. A validation step S314 determines whether or not rematching of the paired clusters has succeeded. If not, an alternate pairing can be selected and processing returns to step S310. If rematching is successful, a recomputation step S316 executes, readjusting the connection graph according to processing results.

Continuing with the process of FIG. 5, decision step 320 checks to determine whether or not there are unprocessed articulations in the connection graph. Each articulation is processed in order to test for desired or optimum arrangement of views if not, processing continues to the next decision step S330. If there are unprocessed articulations, a correction step S322 executes, in which processor computation attempts to rematch the articulation. This can involve removing the weak single relation (transformation) and recalculating to determine if other relations improve the connection pattern. With respect to the example connection graph of FIG. 5, correction step S322 may attempt to rematch component view V74 by setting aside the transform that relates view V74 to cluster 22a via view V76. This makes cluster 22a a temporarily disconnected cluster. The process then re-computes matches for each of views V76, V77, V85, V86, and V87 to views in cluster 22b.

Still following the process outlined in FIG. 6, a validation step S324 determines whether or not rematching of the articulation has succeeded. If not, an alternate articulation can be selected and processing returns to step S320. If rematching is successful, a recomputation step S326 executes, readjusting the connection graph according to processing results.

Continuing with the process of FIG. 6, decision step 330 checks to determine whether or not there are unprocessed poorly connected views in the connection graph. A poorly connected view is a view that has fewer connected neighbors than a predetermined threshold. Each poorly connected view is processed in order to test for a selected or optimum arrangement of views. If there are unprocessed poorly connected views, a correction step S332 executes, in which processor computation attempts to rematch the poorly connected view. This can involve removing weak relations (e.g., transformations) and recalculating to determine if other relations improve the connection pattern. A validation step S334 determines whether or not rematching of the poorly connected view has succeeded. If not, an alternate poorly connected view can be selected and processing returns to step S330. If rematching is successful, a recomputation step S336 executes, readjusting the connection graph according to processing results.

Rematching for Connection Graph Refinement

The process for rematching identifies various anomalies, such as disconnected or poorly connected clusters, articulations, and poorly connected matches, then temporarily ignores weak connections and attempts to generate improved positioning. Re-matching criteria for the connection graph refinement process can include any of the following:

(i) Comparative number of connections for one or more views before and after rematching calculations. In general, an arrangement with a higher number of connections is considered to provide a better match.

(ii) Number of transformations consistent with the computed consensus transform (e.g., number of inliers).

(iii) Number of retries attempted for rematching one or more views in a cluster.

Some matches may not yet exist and need to be computed as part of this process.

For moving a group of views, such as shown in cluster 22a of FIG. 5, a consensus transform can be computed. This can be done by considering all relative matches between views in the cluster and the larger, target grouping. Comparison of these relative matches can be used to calculate a consensus transform that provides averaged rotation and translation values that can be applied to multiple views. The averaging can be restricted to a subset of transformations, obtained using RANdom SAmple Consensus method (RANSAC) or similar techniques for robust clustering in a noisy dataset. RANSAC processing is well known to those skilled in the imaging arts for estimating modeling parameters used in forming a composite surface.

Techniques for calculating a consensus transform from the selected subset include matrix decomposition into another representation (such as quaternion, scale, skew, translation), interpolation between representations, and recomposition to provide an average transform that can be used to provide candidate matching.

Figure 7A:
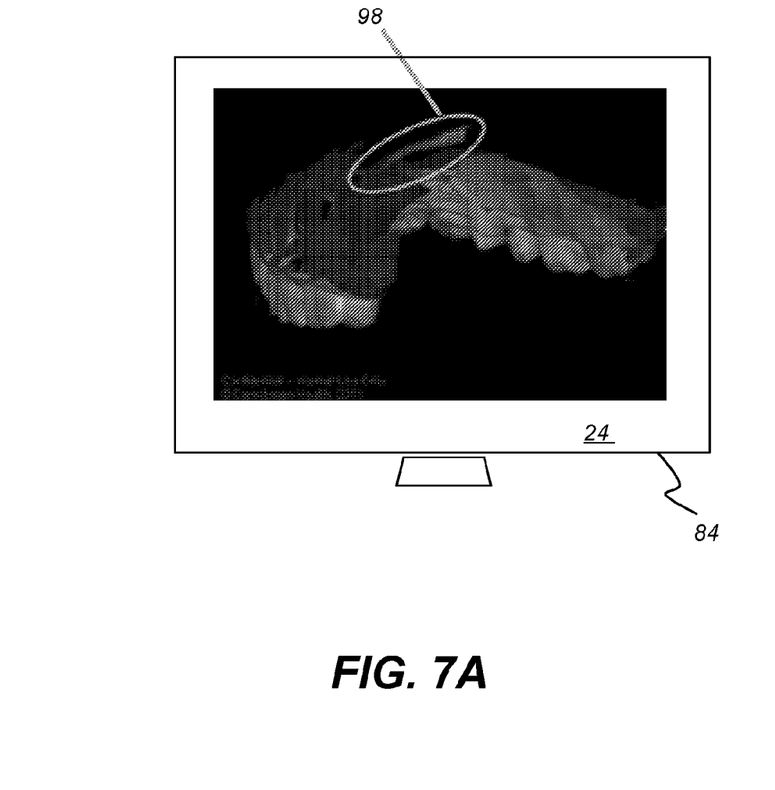
FIG. 7A shows an example with poor positioning due to an articulation in the view matching process.
Figure 7B:
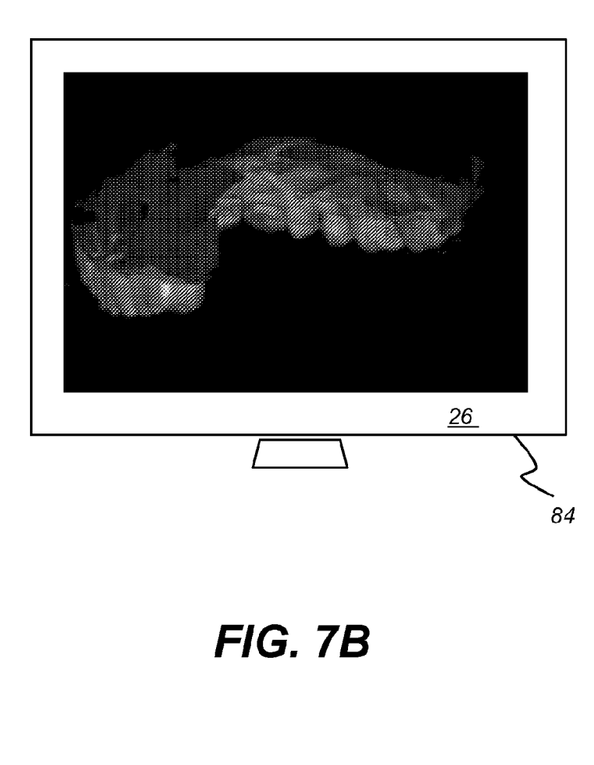
FIG. 7B shows a corrected composite surface according to embodiments of the application.
Figure 8A:
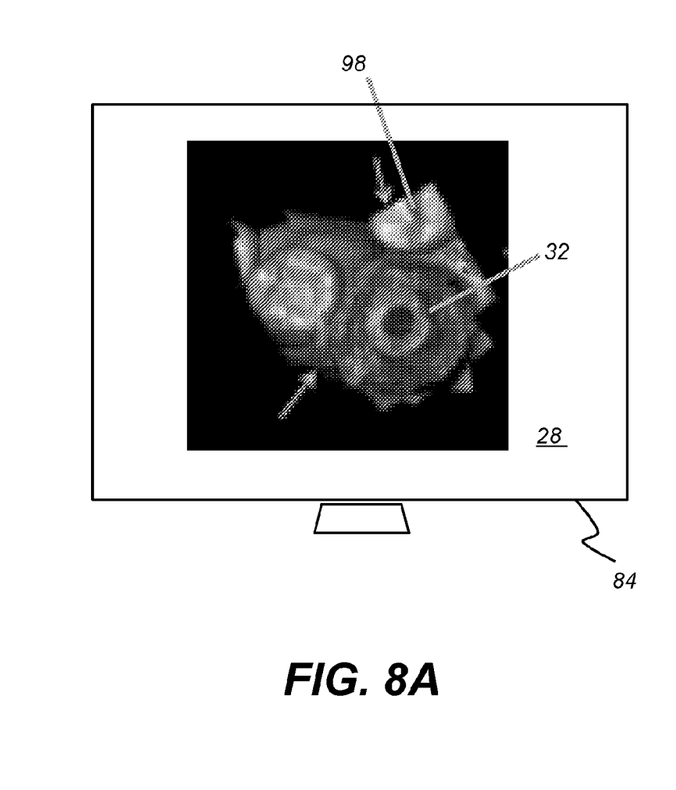
FIG. 8A shows a poorly connected segment due to an articulation for a composite surface that shows an implant.
Figure 8B:
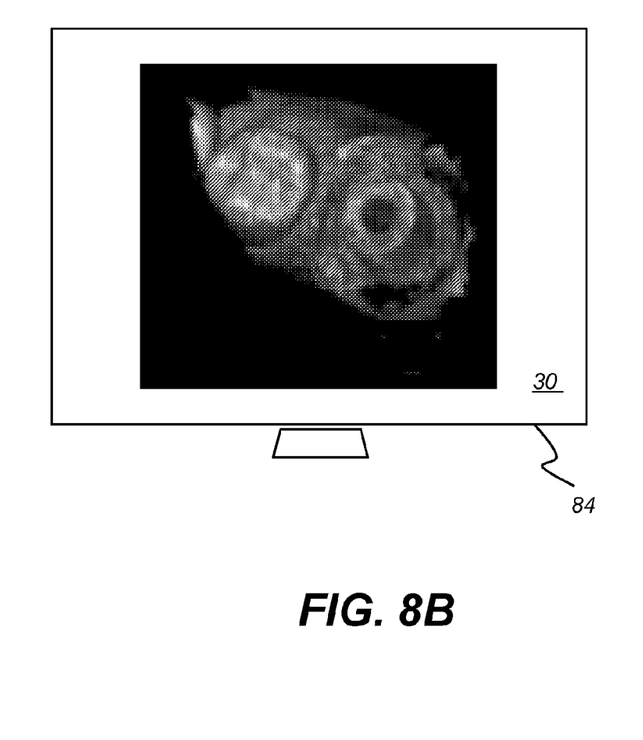
FIG. 8B shows a corrected surface for the implant of FIG. 8A with proper positioning according to embodiments of the application.

In general, articulations often indicate problems relating to view positioning. FIGS. 7A and 7B show an example in which an articulation causes a segment 98 to be poorly positioned. FIG. 7B shows correction to a composite surface 24 after removing the articulation and re-generating the relation data to provide composite surface 26. FIG. 8A shows poorly connected segment 98 due to an articulation for a surface 28 that shows an implant 32. FIG. 8B shows a corrected surface 30 with proper positioning.

Dynamic Updating

Embodiments of the present disclosure allow automatic updating of a composite 3-D surface as additional component 3-D views are scanned. Existing surface data content can be replaced by data from newly scanned views. This allows the technician or practitioner to correct problems and re-image areas where improvement in image quality is desired or where previous scanning procedure may have missed some image content. When this is performed, the process described with reference to FIGS. 3 through 6 for forming the composite surface and correcting errors is repeated as often as is desired or needed for updating the image content.

Embodiments of the present disclosure provide automated detection and correction of 3-D view stitching anomalies, such as those shown in FIG. 2A. According to an embodiment of the present disclosure, the view stitching process displays results to the viewer as views are acquired and mapped to the target 3-D surface. Correction takes place without requiring viewer interaction; the observer can watch stitching corrections as they are processed by the image processing system, as shown in displays 84 of FIGS. 7A-8B.

According to another alternate embodiment of the present disclosure, the operator has the option to identify one or more poorly connected segments in the displayed composite 3-D surface, wherein the poorly connected segments are to be moved. Identification by the operator can include using a mouse or other pointer, selecting segments from a list, or other alternatives. In response, the system automatically re-calculates relation data in order to move the identified image content.

According to another alternate embodiment of the present disclosure, the system identifies views that need placement correction, according to the arrangement of neighbor relations modeled by the connection graph. These views are highlighted as displayed to the user for selection, such as by outlining as shown in FIG. 7A. The operator may then choose to accept an automatic replacement of the highlighted views or delete the selected views or reject an automatic replacement of those views. The operator may alternately enter an instruction that identifies a poor placement, such as by indicating the poorly positioned view using a touch screen, for example.

Although embodiments of the present disclosure primarily describe scanning and generation of 3-D views for dental imaging, it can be appreciated that the methods described herein can be used in any number of applications in which a set of 3-D views is combined in order to provide a composite 3-D surface. The surface can be opaque, semi-transparent, or even translucent. Preconditioning of the surface for imaging may or may not be needed, depending on characteristics of the imaging type.

Consistent with one embodiment, the present invention utilizes a computer program with stored instructions that perform on image data accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

In one embodiment, a method for displaying a 3-D surface of an object can be executed at least in part on a computer and include acquiring a set comprising a plurality of members, wherein each member is a 3-D view of the object generated using patterned illumination; generating relation data that associates each member of the set of 3-D views to at least one other member of the set according to at least displacement between the members; displaying a composite surface of the object, formed according to the generated relation data; automatically detecting one or more positioning errors in the displayed composite surface according to the generated relation data and re-generating at least a portion of the relation data to correct the one or more positioning errors; and modifying the display to show a corrected composite surface formed according to the re-generated relation data.

While the invention has been illustrated with respect to one or more implementations, alterations and/or modifications can be made to the illustrated examples without departing from the spirit and scope of the appended claims. In addition, while a particular feature of the invention can have been disclosed with respect to one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for displaying a 3-D surface of an object, the method executed at least in part on a computer and comprising:
    acquiring a set comprising a plurality of members, wherein each member is a 3-D view of the object;
    generating relation data that associates each member of the set of 3-D views to at least one other member of the set according to at least displacement between the members;
    forming a composite 3-D surface of the object according to the generated relation data;
    automatically detecting one or more positioning errors in the composite 3-D surface according to the generated relation data and re-generating at least a portion of the relation data to correct the one or more positioning errors; and
    displaying a corrected composite 3-D surface formed according to the re-generated relation data.

2. The method of claim 1 further comprising displaying the composite surface that has position errors and updating the display during automatic correction.

3. The method of claim 1 wherein one or more of the 3-D views is a point cloud.

4. The method of claim 1 wherein one or more of the 3-D views is a mesh or a range image.

5. The method of claim 1 wherein one or more of the 3-D views is generated according to patterned illumination.

6. The method of claim 1 wherein the member views are acquired using a digital camera.

7. The method of claim 1 wherein the generated relation data corresponds to a connection graph model.

8. The method of claim 1 further comprising highlighting the displayed surface to show one or more positioning errors.

9. The method of claim 1 wherein the set of 3-D views is acquired using a handheld 3-D scanner.

10. The method of claim 1 wherein the set of 3-D views is acquired using an intra-oral 3-D scanner.

11. The method of claim 1 wherein the displacement between the members comprises translation and rotation data.

12. The method of claim 1 further comprising highlighting the displayed surface to show the one or more detected positioning errors.

13. A method for displaying a 3-D surface of an patient's teeth, the method executed at least in part on a computer and comprising iteratively repeating, one or more times, the steps of:
    a) acquiring a set comprising a plurality of members, wherein each member is a 3-D view of the teeth;
    b) generating relation data that associates each member of the set of 3-D views to at least one other member of the set according to at least displacement between the members;
    c) displaying a composite surface of the teeth, formed according to the generated relation data;
    d) detecting one or more positioning errors in the displayed composite surface according to the generated relation data and re-generating at least a portion of the relation data to correct the one or more positioning errors; and
    e) modifying the display to show a corrected composite surface formed according to the re-generated relation data.

14. The method of claim 13 wherein detecting the one or more positioning errors is performed automatically, wherein one or more of the 3-D views is generated according to patterned illumination.

15. The method of claim 13 wherein detecting the one or more positioning errors further comprises accepting an operator instruction that identifies one or more poorly connected 3-D views.

* * * * *